US012592833B2

(12) United States Patent
Revadigar et al.

(10) Patent No.: US 12,592,833 B2
(45) Date of Patent: Mar. 31, 2026

(54) METHOD FOR AUTHENTICATION AND RELATED DEVICES

(71) Applicant: Shenzhen Yinwang Intelligent Technologies Co., Ltd., Shenzhen (CN)

(72) Inventors: Girish Shivalingappa Revadigar, Singapore (SG); Zhuo Wei, Singapore (SG); Zhen Li, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 18/677,163

(22) Filed: May 29, 2024

(65) Prior Publication Data

US 2024/0313981 A1      Sep. 19, 2024

Related U.S. Application Data

(63) Continuation of application No. PCT/CN2021/134667, filed on Nov. 30, 2021.

(51) Int. Cl.
*H04L 9/32*          (2006.01)
*H04W 12/041*      (2021.01)
*H04W 12/06*        (2021.01)

(52) U.S. Cl.
CPC ......... *H04L 9/3247* (2013.01); *H04W 12/041* (2021.01); *H04W 12/06* (2013.01)

(58) Field of Classification Search
CPC .......... B60R 2325/108; B60R 25/2018; B60R 25/24; H04L 2209/84; H04L 63/0823;
(Continued)

(56) References Cited

U.S. PATENT DOCUMENTS 9,066,327 B2 *   6/2015   Liu .................... H04W 52/0245
9,363,710 B1 *   6/2016   Ganesh ................... H04W 4/80
(Continued)

FOREIGN PATENT DOCUMENTS

GB          2561583  A      10/2018

OTHER PUBLICATIONS

Xinghua Li et al., Efficient and Consistent Key Extraction Based on Received Signal Strength for Vehicular Ad Hoc Networks (Mar. 22, 2017). (Year: 2017).*
(Continued)

*Primary Examiner* — Sharon S Lynch
(74) *Attorney, Agent, or Firm* — Conley Rose, P.C.

(57)          ABSTRACT

A method for authentication and related devices includes obtaining a first session key $B_{S1}$ generated according to a set X and a set Y. The set X is a set of samples of received signal strength indicators (RSSIs) of a wireless channel of a user equipment (UE), and the set Y is a set of samples of RSSIs of a wireless channel of a vehicle. Upon receiving a second message from the UE, wherein the second message is hashed by a second session key $B_{S2}$, extracting the second session key $B_{S2}$ from the second message. When the first session key $B_{S1}$ is the same as the second session key $B_{S2}$, the authentication between the UE and the vehicle is successful.

20 Claims, 9 Drawing Sheets

Authentication system
100

103 internet connection internet connection

101 wireless channel

102

(58) Field of Classification Search

CPC ..... H04L 63/126; H04L 9/001; H04L 9/0643; H04L 9/321; H04L 9/3247; H04L 9/3271; H04W 12/041; H04W 12/0431; H04W 12/06; H04W 12/069; H04W 12/108; H04W 12/122; H04W 12/63; H04W 12/79; H04W 4/40; H04W 4/80; H04W 84/18

See application file for complete search history.

(56) References Cited

U.S. PATENT DOCUMENTS

| | | | | |
|---|---|---|---|---|
| 10,440,576 B1 * | 10/2019 | Casamassima | ...... | H04B 17/318 |
| 11,122,425 B2 * | 9/2021 | Zaman | .................. | H04L 9/0852 |
| 11,381,970 B2 * | 7/2022 | Revadigar | .............. | H04W 4/40 |
| 2016/0142941 A1 * | 5/2016 | Ganesh | ................... | H04W 4/80 |
| | | | | 455/41.2 |
| 2020/0021977 A1 * | 1/2020 | Zaman | ................ | H04W 12/041 |
| 2021/0345110 A1 * | 11/2021 | Revadigar | .............. | B60R 25/24 |

OTHER PUBLICATIONS

Abdeldime M.S. Abdelgader & Lenan Wu, A Secret Key Extraction Technique Applied in Vehicular Networks in 2014 IEEE 17th International Conference on Computational Science and Engineering 1396-1403 (2014). (Year: 2014).*

Xiaojun Zhu et al., Using Wireless Link Dynamics to Extract a Secret Key in Vehicular Scenarios, in IEEE Transactions on Mobile Computing 2065-2078 (vol. 16, Issue: 7, Jul. 1, 2017). (Year: 2017).*

David Tse, et al, "Fundamentals of wireless communications," Cambridge University Press, Feb. 2017, 644 pages.

Yevgeniy Dodis, Fuzzy Extractors: How to Generate Strong Keys from Biometrics and Other Noisy Data, SIAM Journal on Computing 38, Mar. 1, 2008, 47 pages.

Gattacking Bluetooth Smart Device, Whitepaper, Accessed online: Jul. 3, 2019, 15 pages.

Mike Szczys, BLE jamming and hijacking, https://hackaday.com/2019/08/10/new-bluetooth-5-channel-hopping-reverse-engineered-for-jamming-and-hijacking/, Aug. 10, 2019, 5 pages.

Aurelien Fracillon, Relay Attacks on Passive Keyless Entry and Start Systems in Modern Cars, in proceedings of Network and Distributed System Security (NDSS), Feb. 2011, 15 pages.

* cited by examiner

Authentication system
100

103 internet connection internet connection

101 wireless channel

102

S301. $L_C$ or the session key $B_S$

S302, obtain a first session key $B_{S1}$

S303. $L_C$ or the session key $B_S$

S304, obtain a second session key $B_{S2}$

S305. second message hashed by $B_{S2}$

S306, extract $B_{S2}$ from the second message

S307, determine the authentication is successful if $B_{S1}$ is same as $B_{S2}$ server

UE

Vehicle

METHOD FOR AUTHENTICATION AND RELATED DEVICES

CROSS-REFERENCE TO RELATED APPLICATIONS

This is a continuation of International Patent Application No. PCT/CN2021/134667, filed on Nov. 30, 2021, the disclosure of which is hereby incorporated by reference in its entirety.

TECHNICAL FIELD

Embodiments of the present disclosure relate to the field of information technologies, and more specifically, to a method for authentication and related devices.

BACKGROUND

Keyless entry systems for vehicles/automobiles are becoming more and more popular for their ease of usage, i.e., the physical key of the vehicle need not be carried by every user, and multiple users can be authorized by the vehicle's owner to use his/her vehicle. These systems use a digital key stored in user's personal device e.g., mobile phone, which is provided to the user by a trusted entity at the time of user registration, and BLUETOOTH Low Energy (BLE) technology is used to communicate between the vehicle and user equipment (UE).

The current solutions for keyless entry systems (KES) are vulnerable for relay attack and other active attack which is serious issue. Some of the existing solutions use distance estimation methods to calculate the distance between the mobile device and the vehicle using signal features. If the device is found to be in the range, then the vehicle accepts the commands.

Many of the existing KES solutions suffer from active attacks like replay and relay attacks. In relay attacks, an attacker can relay the command messages between the vehicle and key/UE even if they are far away or outside their communication range. Here, the attacker's device communicates with the real key/UE impersonating as a vehicle, meaning, it sends the commands/messages sent by the vehicle for finding the key in its range. When the real key/UE listens to this message sent by attacker's device, it responds to the message assuming it is the user's legitimate/ own vehicle. The attacker then captures/records the signal from actual key/UE, amplifies and transmits to the vehicle. The vehicle receives the messages sent by the attacker's device, and interprets them as commands sent by original key/UE. Thus, the attacker can easily unlock and steal the vehicle. Similarly, the attacker can also record and reply the messages between vehicle and key/UE to unlock and steal the vehicle. These are some of the most serious threats to KES, and thus, the security of KES solutions is very important to prevent such attacks.

SUMMARY

Embodiments of this disclosure provide a method for authentication and related devices. The technical solution can improve the security of proximity authentication.

According to a first aspect, an embodiment provides a method for authentication, characterized in including: obtaining, by a vehicle, a first session key $B_{S1}$, wherein the first session key $B_{S1}$ is generated according to $L_C$ generated by a server, $L_C$ is a list of common indexes by combining $L_{X\_disc}$ and $L_{Y\_disc}$, and $L_{X\_disc}$ is a list of indexes discarded during the quantization of a set X, $L_{Y\_disc}$ is a list of indexes discarded during the quantization of a set Y, wherein the set X is a set of samples of received signal strength indicators (RSSIs) of a wireless channel of a UE, and the set Y is a set of samples of RSSIs of a BLE channel of the vehicle; receiving, by the vehicle, a second message from the UE, wherein the second message is hashed by a second session key $B_{S2}$, the second session key $B_{S2}$ is also generated according to $L_C$ generated by the server; extracting, by the vehicle, the second session key $B_{S2}$ from the second message; determining, by the vehicle, if the first session key $B_{S1}$ is the same as the second session key $B_{S2}$, the authentication between the UE and the vehicle is successful.

A remote server based attack resilient authentication method is provided for wireless enabled vehicle and UE. The proposed method uses a server to verify between the vehicle and the UE, and has no direct communication between vehicle and UE during authentication. Hence attacker cannot launch data modification, false data injection, relay or replay attack. Furthermore, the server can use robust methods to analyze the received signal strength (RSS) data shared by vehicle and UE without worrying about the danger of leaking any useful information during authentication, does not leak any useful information during authentication.

In a possible design, wherein the obtaining, by a vehicle, a first session key $B_{S1}$, comprises: receiving, by the vehicle, a first message from the server, wherein the first message includes: $(E(K_{pub\_V}, m_{10}), S(K_{priv\_S}, m_{12})$, wherein the notation $E(k, m)$ means encryption of message m using secret key k, the notation $S(k, m)$ denotes digital signature on m using key k, $K_{pub\_V}$ is the public key of the vehicle, $K_{priv\_S}$ is the private key of the server, $m_{10}=n\|CMD\_AUTH\_FINISH\|B_S$, n is a nonce, CMD_AUTH_FINISH is a command identifier(ID) for authentication finishing, $B_S$ is the session key; determining, by the vehicle, the session key $B_S$ extracted from the first message as the first session key $B_{S1}$.

In a possible design, wherein the second message comprises: $(E(K_U, m_{13}), S(K_{priv\_D}, m_{14}))$, wherein the notation $E(k, m)$ means encryption of message m using secret key k, notation $S(k, m)$ denotes digital signature on m using key k, $K_U$ is a BLUETOOTH user device key shared between the UE and the vehicle by a trusted entity, $K_{priv\_D}$ is the private key of the UE, $m_{13}=n\|CMD\_AUTH\_CHK$, n is a nonce, CMD_AUTH_CHK is a command ID for authentication checking, $m_{14}=H(B_{S2}, E(K_U, m_{13}))$, the notation $H(k, m)$ is the cryptographic hash on m using key k, $B_{S2}$ is the second session key.

In a possible design, wherein the obtaining, by a vehicle, a first session key $B_{S1}$, comprises: receiving, by the vehicle, a third message from the server, the third message includes: $(E(K_{pub\_V}, m_{10}), S(K_{priv\_S}, m_{11}))$, wherein the notation $E(k, m)$ means encryption of message m using secret key k, notation $S(k, m)$ denotes digital signature on m using key k, $K_{pub\_V}$ is the public key of the vehicle, $K_{priv\_S}$ is the private key of the server, $m_{10}=n\| CMD\_LIST\_COM\| L_C$, n is a nonce, CMD_LIST_COM is a command ID for list of common indices or items; generating, by the vehicle, the first session key $B_{S1}$ according to $L_C$.

In a possible design, wherein the second message comprises: $(E(K_U, m_{14}), S(K_{priv\_D}, m_{15}))$, wherein the notation $E(k, m)$ means encryption of message m using secret key k, notation $S(k, m)$ denotes digital signature on m using key k, $K_U$ is a BLUETOOTH user device key shared between the UE and the vehicle by a trusted entity, n is a nonce, $K_{priv\_D}$ is the private key of the UE, $m_{14}$ n||CMD_AUTH_CHK, CMD_AUTH_CHK is a command ID for authentication checking, and $m_{15}$ H($B_{S2}$, E($K_U$, $m_{14}$)), the notation H(k, m) is the cryptographic hash on m using key k, $B_{S2}$ is the second session key.

In a possible design, wherein the method further comprises: obtaining, by the vehicle, the set Y by recoding RSSIs of the wireless channel of the vehicle; sending, by the vehicle, the set Y to the server. In a possible design, wherein the method further comprises: obtaining, by the vehicle, the set Y by recoding RSSIs of the wireless channel of the vehicle; obtaining, by the vehicle, a bit string $B_Y$ and $L_{Y\_disc}$ by applying quantization to the set Y; sending, by the vehicle, the bit string $B_Y$ and $L_{Y\_disc}$ to the server.

According to a second aspect, an embodiment provides a method for authentication, characterized in including: obtaining, by a UE, a second session key $B_{S2}$, wherein the second session key $B_{S2}$ is generated according to $L_C$ generated by a server, $L_C$ is a list of common indexes by combining $L_{Y\_disc}$ and $L_{Y\_disc}$, and $L_{Y\_disc}$ is a list of indexes discarded during the quantization of a set X, $L_{Y\_disc}$ is a list of indexes discarded during the quantization of a set Y, wherein the set X is a set of samples of RSSIs of a wireless channel of the UE, and the set Y is a set of samples of RSSIs of a wireless channel of a vehicle; sending, by the UE, a second message to the vehicle, wherein the second message is hashed by a second session key $B_{S2}$, wherein the second session key $B_{S2}$ is used for checking the authentication between the vehicle and the UE.

In a possible design, wherein the obtaining, by a UE, a second session key $B_{S2}$, comprises: receiving, by the UE, a fourth message from the server, wherein the fourth message includes: (E($K_{pub\_D}$, $m_{10}$), S($K_{priv\_S}$, $m_{11}$), wherein the notation E(k, m) means encryption of message m using secret key k, the notation S(k, m) denotes digital signature on m using key k, $K_{pub\_D}$ is the public key of the UE, $K_{priv\_S}$ is the private key of the server, $m_{10}$=n||CMD_AUTH_FINISH||$B_S$, n is a nonce, CMD_AUTH_FINISH is a command identifier(ID) for authentication finishing, $B_S$ is a session key generated by the server according to $L_C$, and $m_{11}$=H(E($K_{pub\_D}$, $m_{10}$)), the notation H(k, m) is the cryptographic hash on m using key k; determining, by the UE, the session key $B_S$ extracted from the fourth message as the second session key $B_{S2}$.

In a possible design, wherein the second message comprises: (E($K_U$, $m_{13}$),S($K_{priv\_D}$, $m_{14}$)), wherein the notation E(k, m) means encryption of message m using secret key k, notation S(k, m) denotes digital signature on m using key k, $K_U$ is a BLUETOOTH user device key shared between the UE and the vehicle by a trusted entity, $K_{priv\_D}$ is the private key of the UE, $m_{13}$=n||CMD_AUTH_CHK, n is a nonce, CMD_AUTH_CHK is a command ID for authentication checking, $m_{14}$=H($B_{S2}$, E($K_U$, $m_{13}$)), the notation H(k, m) is the cryptographic hash on m using key k, $B_{S2}$ is the second session key.

In a possible design, wherein the obtaining, by a UE, a second session key $B_{S2}$, comprises: receiving, by the UE, a fifth message from the server, wherein the fifth message includes: (E($K_{pub\_D}$, $m_{12}$), S($K_{priv\_S}$, $m_{13}$), wherein the notation E(k, m) means encryption of message m using secret key k, the notation S(k, m) denotes digital signature on m using key k, $K_{pub\_D}$ is the public key of the UE, $K_{priv\_S}$ is the private key of the server, $m_{12}$=n||CMD_SS||$B_S$, n is a nonce, CMD_SS is a command ID for session secret, $B_S$ is a session key generated by the server according to $L_C$, and $m_{13}$=H(E($K_{pub\_D}$, $m_{12}$)), the notation H(k, m) is the cryptographic hash on m using key k; determining, by the UE, the session key $B_S$ extracted from the fifth message as the second session key $B_{S2}$.

In a possible design, wherein the second message comprises: (E($K_U$, $m_{14}$),S($K_{priv\_D}$, $m_{15}$)), wherein the notation E(k, m) means encryption of message m using secret key k, notation S(k, m) denotes digital signature on m using key k, $K_U$ is a BLUETOOTH user device key shared between the UE and the vehicle by a trusted entity, n is a nonce, $K_{priv\_D}$ is the private key of the UE, $m_{14}$=n||CMD_AUTH_CHK, CMD_AUTH_CHK is a command ID for authentication checking, and $m_{15}$=H($B_{S2}$, E($K_U$, $m_{14}$)), the notation H(k, m) is the cryptographic hash on m using key k, $B_{S2}$ is the second session key.

In a possible design, wherein the method further comprises: obtaining, by the UE, the set X by recoding RSSIs of the wireless channel of the UE; sending, by the UE, the set X to the server.

In a possible design, wherein the method further comprises: obtaining, by the UE, the set X by recoding RSSIs of the wireless channel of the UE; obtaining, by the vehicle, a bit string Bx and $L_{X\_disc}$ by applying quantization to the set Y; sending, by the vehicle, $L_{X\_disc}$ to the server.

According to a third aspect, an embodiment provides a method for authentication, characterized in including: obtaining, by a server, $L_{X\_disc}$, $L_{X\_disc}$ is a list of indexes discarded during the quantization of a set X, the set X is a set of samples of RSSIs of a wireless channel of a UE; obtaining, by the server, $L_{Y\_disc}$, $L_{Y\_disc}$ is a list of indexes discarded during the quantization of a set Y, the set Y is a set of samples of RSSIs of a wireless channel of a vehicle; generating, by the server, a session key $B_S$, according to $L_C$, $L_C$ is a list of common indexes by combining $L_{X\_disc}$ and $L_{Y\_disc}$; sending, by the server, $L_C$ or the session key $B_S$ to the vehicle, wherein $L_C$ or the session key $B_S$ is used for checking the authentication between the vehicle and the UE; sending, by the server, $L_C$ or the session key $B_S$ to the UE.

In a possible design, wherein the obtaining, by a server, $L_{X\_disc}$, comprises: receiving, by the server, the sex X from the UE; obtaining, by the server, a bit string Bx and $L_{X\_disc}$ by applying quantization to the set X; or receiving, by the server, $L_{X\_disc}$ from the UE; and wherein the obtaining, by a server, $L_{Y\_disc}$, comprises: receiving, by the server, the sex Y from the vehicle; obtaining, by the server, a bit string $B_Y$ and $L_{Y\_disc}$ by applying quantization to the set Y; or receiving, by the server, $L_{Y\_disc}$ from the vehicle.

In a possible design, wherein before the sending, by the server, $L_C$ or the session key $B_S$ to the vehicle and the UE, the method further comprises: correcting, by the server, $B_X$ and $B_Y$ by using $L_C$; calculating, by the server, a bit matching ratio B between the corrected $B_X$ and $B_Y$; determining, by the server, the authentication between the UE and the vehicle is successful when the bit matching ratio B is above threshold $T_B$.

In a possible design, wherein before sending, by the server, $L_C$ or the session key $B_S$ to the vehicle and the UE, the method further comprises: calculating, by the server, a Pearson correlation coefficient P between the set X and the set Y; determining, by the server, the authentication between the UE and the vehicle is successful when the Pearson correlation coefficient P is above threshold $T_P$.

In a possible design, wherein the sending, by the server, $L_C$ or the session key $B_S$ to the vehicle, comprises: sending, by the server, a first message to the vehicle, wherein the first message includes: (E($K_{pub\_V}$, $m_{10}$), S($K_{priv\_S}$, $m_{12}$), wherein the notation E(k, m) means encryption of message m using secret key k, the notation S(k, m) denotes digital signature on m using key k, $K_{pub\_V}$ is the public key of the vehicle, $K_{priv\_S}$ is the private key of the server, $m_{10}$=n‖CMD_AUTH_FINISH‖$B_S$, n is a nonce, CMD_AUTH_FINISH is a command identifier(ID) for authentication finishing.

In a possible design, wherein the sending, by the server, $L_C$ or the session key $B_S$ to the vehicle, comprises: sending, by the server, a third message to the vehicle, wherein the third message includes: (E($K_{pub\_V}$, $m_{10}$), S($K_{priv\_S}$, $m_{11}$), wherein the notation E(k, m) means encryption of message m using secret key k, notation S(k, m) denotes digital signature on m using key k, $K_{pub\_V}$ is the public key of the vehicle, $K_{priv\_S}$ is the private key of the server, $m_{10}$=n‖CMD_LIST_COM‖$L_C$, n is a nonce, CMD_LIST_COM is a command ID for list of common indices or items.

In a possible design, wherein the sending, by the server, $L_C$ or the session key $B_S$ to the UE, comprises: sending, by the server, a fourth message to the UE, wherein the fourth message includes: (E($K_{pub\_D}$, $m_{10}$), S($K_{priv\_S}$, $m_{11}$), wherein the notation E(k, m) means encryption of message m using secret key k, the notation S(k, m) denotes digital signature on m using key k, $K_{pub\_D}$ is the public key of the UE, $K_{priv\_S}$ is the private key of the server, $m_{10}$=n‖CMD_AUTH_FINISH‖$B_S$, n is a nonce, CMD_AUTH_FINISH is a command ID for authentication finishing, and $m_{11}$=H(E($K_{pub\_D}$, $m_{10}$)), the notation H(k, m) is the cryptographic hash on m using key k.

In a possible design, wherein the sending, by the server, $L_C$ or the session key $B_S$ to the UE, comprises: sending, by the server, a fifth message to the UE, wherein the fifth message includes: (F($K_{pub\_D}$), $m_{12}$), S($K_{priv\_S}$, $m_{13}$), wherein the notation E(k, m) means encryption of message m using secret key k, the notation S(k, m) denotes digital signature on m using key k, $K_{pub\_D}$ is the public key of the UE, $K_{priv\_S}$ is the private key of the server, $m_{12}$ n‖CMD_SS‖$B_S$, n is a nonce, CMD_SS is a command ID for session secret, and $m_{13}$ H(E($K_{pub\_D}$), $m_{12}$)), the notation H(k, m) is the cryptographic hash on m using key k.

According to a fourth aspect, an embodiment provides a vehicle, and the vehicle has function of implementing the method in the first aspect. The function may be implemented by hardware, or may be implemented by hardware executing corresponding software. The hardware of the software includes one or more modules corresponding to the function.

According to a fifth aspect, an embodiment provides a UE, and the UE has function of implementing the method in the first aspect. The function may be implemented by hardware, or may be implemented by hardware executing corresponding software. The hardware of the software includes one or more modules corresponding to the function.

According to a sixth aspect, an embodiment provides a UE, and the UE has function of implementing the method in the first aspect. The function may be implemented by hardware, or may be implemented by hardware executing corresponding software. The hardware of the software includes one or more modules corresponding to the function.

According to a seventh aspect, an electronic device is provided, including a processor and a memory. The processor is connected to the memory. The memory is configured to store instructions, the processor is configured to execute the instructions. When the processor executes the instructions stored in the memory, the processor is enabled to perform the method in the first aspect, the second aspect, the third aspect or any possible implementation of the first aspect, the second aspect or the third aspect.

According to an eighth aspect, a chip system is provided, where the chip systems includes a memory and a processor, wherein the memory is configured to store a computer program, and the processor is configured to invoke the computer program from the memory and run the computer program, so that a server on which the chip is disposed performs the method in the first aspect, the second aspect, the third aspect or any possible implementation of the first aspect, the second aspect or the third aspect.

According to a ninth aspect, a computer program product is provided, wherein when the computer program product runs on an electronic device, the electronic device is enabled to perform the method in the first aspect, the second aspect, the third aspect or any possible implementation of the first aspect, the second aspect or the third aspect.

DESCRIPTION OF EMBODIMENTS

The following describes the technical solutions in this application with reference to the accompanying drawings.

Figure 1:
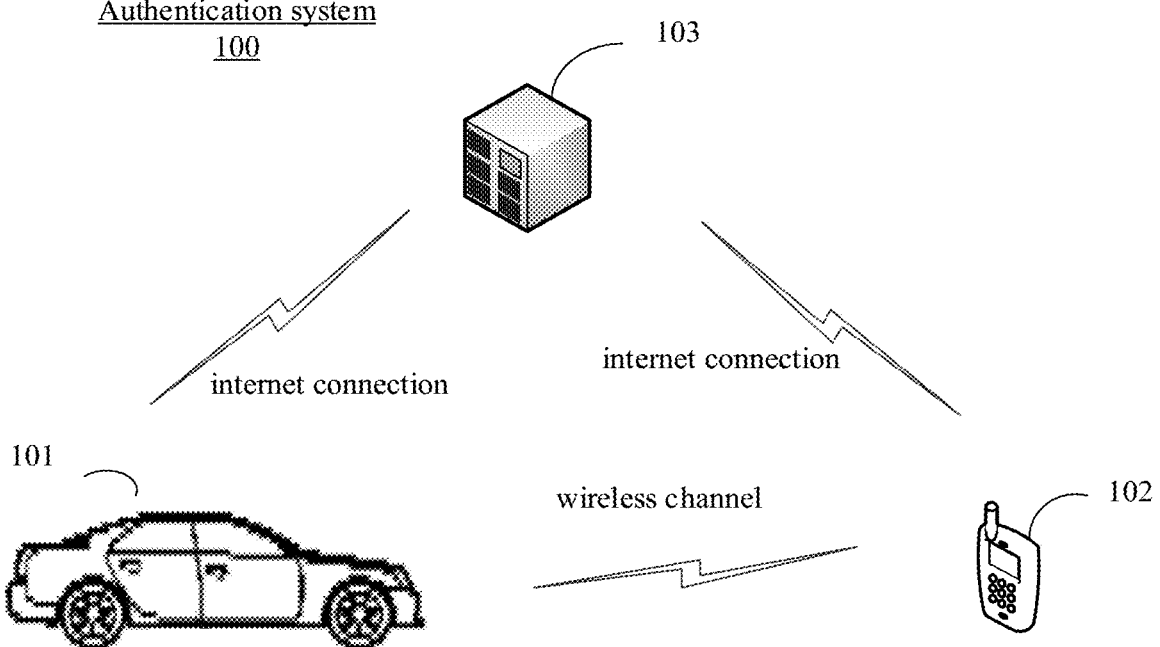
FIG. 1 is a schematic block diagram of a digital key authentication system 100.

FIG. 1 is a schematic block diagram of an authentication system 100.

As shown in FIG. 1, the authentication system 100 may include a vehicle 101, a UE 102 and a server 103.

The UE 102 may be, but is not limited to, a mobile phone, a smart watch or a smart personal device. The vehicle 101 may be, but is not limited to, a car. As an example, vehicle 101 and the UE 102 may belong to a telematics box (TBox) system.

Both the vehicle 101 and the UE 102 may support wireless technology, and both the vehicle 101 and the UE 102 may have capability to connect to the server 103 via internet connection. Optionally, the wireless technology may include BLE technology, Wi-Fi, ZigBee technology or other kind of short-distance wireless communication technologies. Correspondingly, the wireless channel in this application may include BLE channel, Wi-Fi channel, ZigBee channel or other kind of short-distance wireless channels.

The vehicle 101 and the UE 102 may share a wireless connection key KB (symmetric) by a trusted entity e.g., cloud service, which is used for wireless connection establishment and for encrypting the wireless communication.

The vehicle 101 and the UE 102 may share a wireless user device key $K_U$ (symmetric) by a trusted entity e.g., cloud service. The key $K_U$ may be unique and bound to the device, and non-transferable. Furthermore, the key $K_U$ may be used for encrypting the command/data in wireless packets for enhanced security.

The UE 102 may have an identifier (ID) which is denoted as $ID_U$, and is assigned by a trusted party, e.g., cloud service during registration. $ID_U$ may be unique per UE, non-transferrable, and bound to the device.

The server 103 may have Internet IP address and port.

Public Key Infrastructure (PKI) server may issue private-public key pairs as followings:

$K_{priv\_V}$, $K_{pub\_V}$ for the vehicle 101, wherein $K_{priv\_V}$ is the private key of the vehicle 101, $K_{pub\_V}$ is the public key of the vehicle 101;

$K_{priv\_D}$, $K_{pub\_D}$ for the UE 102, wherein $K_{priv\_D}$ is the private key of the UE 102, $K_{pub\_D}$ is the public key of the UE 102;

$K_{priv\_S}$, $K_{pub\_S}$ for the server 103, wherein $K_{priv\_S}$ is the private key of the server 103, $K_{pub\_S}$ is the public key of the server 103.

The application provide a remote server based attack resilient authentication method and related devices. A remote server is used to verify between the vehicle and the UE, and no direct communication between vehicle and UE during authentication. Hence attacker cannot launch data modification, false data injection, relay or replay attack. Furthermore, the authentication is based on lightweight and secure server, the server may use robust methods to analyze the RSS data shared by vehicle and UE. The communication during the authentication is secure and encrypted, hence no useful information during authentication will be leaked.

Due to reciprocity property of the wireless channel, the sets of wireless channel features e.g., RSS on the vehicle and the UE show high correlation in their variation trends, however, the individual values may not be exactly same because of noise in channel, hardware factors, etc.

Only the pair of connected wireless devices can have similar RSS values due to reciprocity property of wireless channel. Adversaries or other wireless devices in the vicinity of legitimate devices cannot predict the RSS values obtained by legitimate parties. Thus, RSS information can be used to confirm different user activities. Both the parties i.e., the vehicle and the UE can confirm this behavior.

If another device e.g., Adversary (or eavesdropper) is present in the same vicinity, and is able to overhear all the communication in the (same) channel used by legitimate devices, the RSS observed by this device (by received packets/signal) will be un-correlated with respect to legitimate devices due to multi-path effects of wireless channel.

For ease of understanding of the embodiments of the present disclosure, basic concepts about some command IDs are described in Table 1 below.

TABLE 1

| Command ID | Definition |
| --- | --- |
| CMD_AUTH_CHK | Authentication Check |
| CMD_AUTH_FINISH | Authentication finish |
| CMD_LIST_COM | List of common Indices/items |
| CMD_SS | Session secret or session key |
| CMD_START_REC | to start recording RSSI |
| CMD_ACK_REC | to acknowledge recording RSSI |
| CMD_CHN | Channel sequence |
| CMD_RSS_LOG | Log RSSI data |
| CMD_LIST_DISC | List of discarded items |

Figure 2:
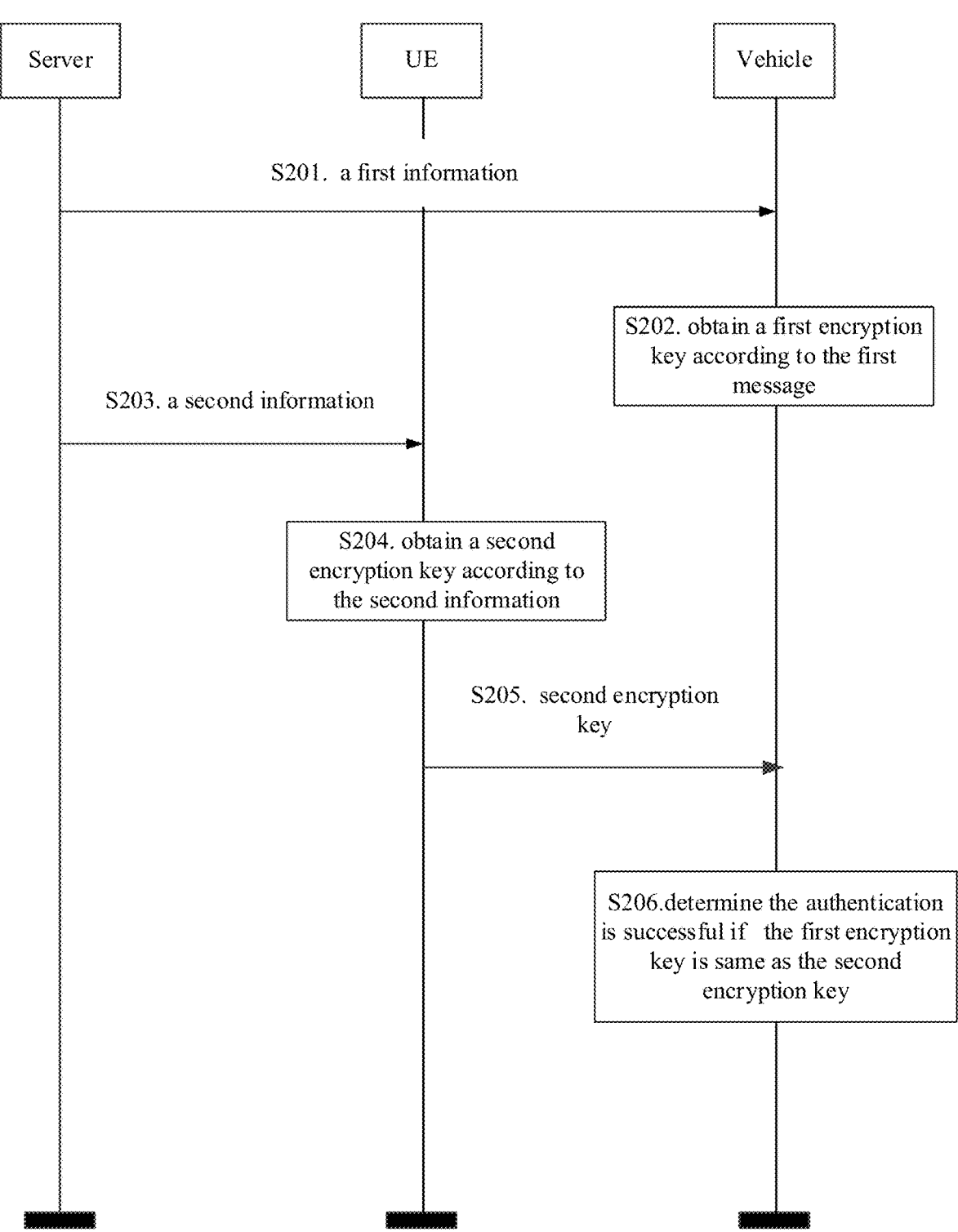
FIG. 2 is flowchart of an embodiment of a method for authentication.

FIG. 2 is flowchart of an embodiment of a method for authentication. The method shown in FIG. 2 may be performed by the vehicle 101, the UE 102 and the server 103 as described in FIG. 1.

S201, sending, by the server, and correspondingly, receiving, by the vehicle, a first information, wherein the first information is used for the authentication between the vehicle and the UE.

Optionally, the first information may include an encryption key or parameters for generating the encryption key.

Optionally, the encryption key is used to verify the connection of the vehicle and the UE. The encryption key may be a session key, or the encryption key may be other kind of encryption key, and the encryption key may be symmetric.

Session key is also called session secret, data encryption key or working key, and may be randomly generated to ensure a secure communication session between users and other device or between two devices. It can be used between communicating users through negotiation. It may be generally generated dynamically and when session data encryption is required.

Optionally, the encryption key or parameters for generating the encryption key may be generated according to a set X and a set Y, wherein the set X is a set of samples of RSSIs of a wireless channel of a UE, and the set Y is a set of samples of RSSIs of a wireless channel of the vehicle.

In some embodiments, the wireless channel may be a BLE channel or the wireless channel also can be other kind of wireless channel, e.g. Wi-Fi or ZIGBEE.

In some embodiments, the parameters for generating the encryption key may be $L_C$, wherein $L_C$ is a list of common indexes by combining $L_{X\_disc}$ and $L_{Y\_disc}$, and $L_{X\_disc}$ is a list of indexes discarded during the quantization of the set X, $L_{Y\_disc}$ is a list of indexes discarded during the quantization of the set Y.

Optionally, the parameters for generating the encryption key may be other parameters, as long as it is generated from the set X and set Y.

Optionally, the first information may be carried in a message sent from the server, the message may be encrypted by the server, e.g. the message may be the first message or the third message illustrated in the following content according to FIG. 3 to FIG. 7.

Optionally, the encryption key may be the session key $B_S$, and the first encryption key may be the first session key $B_{S1}$ in the following content according to FIG. 3 to FIG. 7.

S202, obtaining, by the vehicle, a first encryption key according to the first information.

In some embodiments, the vehicle may determine the encryption key extracted from the first information as the first encryption key, or the vehicle may generate the first encryption key based on the parameters carried in the first information, e.g. $L_C$.

S203, sending, by the server, and correspondingly, receiving, by the UE, a second information, wherein the first information is used for the authentication between the vehicle and the UE.

Optionally, the second information may include the encryption key or parameters for generating the encryption key, i.e., the server may send the encryption key or parameters for generating the encryption key to both the UE and the vehicle for the authentication.

Optionally, the second information may be carried in a message sent from the server, the message may be encrypted by the server, e.g. the message may be the fourth message or the fifth message illustrated in the following content according to FIG. 3 to FIG. 7.

S204, obtaining, by the UE, a second encryption key, wherein the second encryption key is generated according to the second information.

In some embodiments, the UE may determine the encryption key extracted from the second information as the second encryption key, or the UE may generate the second encryption key based on the parameters carried in the second information, e.g., $L_C$.

Optionally, the second encryption key may be the second session key $B_{S2}$ in the following content according to FIG. 3 to FIG. 7.

S205, sending, by the UE, and correspondingly, receiving, by the vehicle, the second encryption key.

Optionally, the second encryption key may be transmitted by an implicit way, e.g. the UE may send a second message (as described in FIG. 3) to the vehicle, wherein the second message is hashed by the second encryption key, and the vehicle may extract the second encryption key from the second message.

S206, determining, by the vehicle, if the first encryption key is the same as the second encryption key, the authentication between the UE and the vehicle is successful, else, the authentication is failed.

The authentication method uses a server to generate encryption key or parameters for generating the encryption key for verifying the connection between the vehicle and the UE, so that direct communication is avoided between vehicle and UE during authentication. Hence attacker cannot launch data modification, false data injection, relay or replay attack, and the security of proximity authentication is improved.

Figure 3:
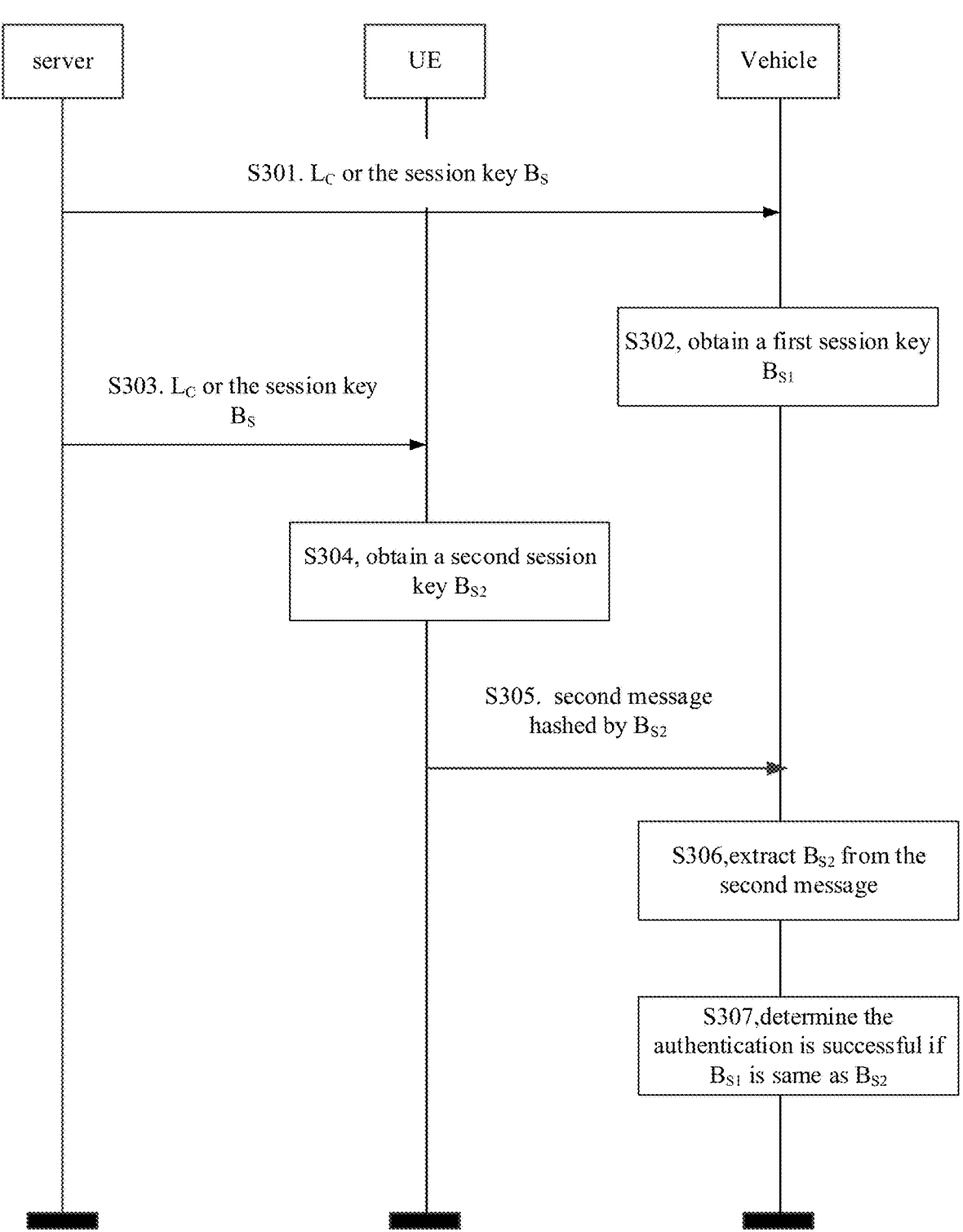
FIG. 3 is flowchart of an embodiment of a method for authentication.

FIG. 3 is flowchart of an embodiment of a method for authentication. The method shown in FIG. 3 may be performed by the vehicle 101, the UE102 and the server 103 as described in FIG. 1.

S301, sending, by the server, and correspondingly, receiving, by the vehicle, $L_C$ or the session key $B_S$.

$L_C$ is a list of common indexes by combining $L_{X\_disc}$ and $L_{Y\_disc}$. $L_{X\_disc}$ is a list of indexes discarded during the quantization of a set X, the set X is a set of samples of RSSIs of a wireless channel of the UE.

In some embodiments, in S301, wherein the sending, by the server, $L_C$ or the session key $B_S$ to the vehicle, comprises: sending, by the server, a first message to the vehicle, wherein the first message includes: $(E(K_{pub\_V}, m_{10}), S(K_{priv\_S}, m_{12})$, wherein the notation E(k, m) means encryption of message m using secret key k, the notation S(k, m) denotes digital signature on m using key k, $K_{pub\_V}$ is the public key of the vehicle, $K_{priv\_S}$ is the private key of the server, $m_{10}$=n∥CMD_AUTH_FINISH∥$B_S$, n is a nonce, CMD_AUTH_FINISH is a command identifier(ID).

In some embodiments, in S301, wherein the sending, by the server, $L_C$ or the session key $B_S$ to the vehicle, comprises: sending, by the server, a third message to the vehicle, wherein the third message includes: $(E(K_{pub\_V}, m_{10}), S(K_{priv\_S}, m_{11})$, wherein the notation E(k, m) means encryption of message m using secret key k, notation S(k, m) denotes digital signature on m using key k, $K_{pub\_V}$ is the public key of the vehicle, $K_{priv\_S}$ is the private key of the server, $m_{10}$=n∥ CMD_LIST_COM∥$L_C$, n is a nonce, CMD_LIST_COM is a command ID.

In some embodiments, in S301, the server may receive the sex X from the UE, and generate a bit string Bx and the $L_{X\_disc}$ by applying quantization to the set X. Or in other embodiments, the UE may obtain the set X by recoding RSSIs of the wireless channel of the UE and generates the $L_{X\_disc}$ by itself, and sends the $L_{X\_disc}$ to the server.

Similarly, in S301, the server may receive the sex Y from the vehicle, and generate a bit string $B_Y$ and the $L_{Y\_disc}$ by applying quantization to the set Y. Or in other embodiments, the vehicle may obtain the set Y by recoding RSSIs of the wireless channel of the vehicle and generates the $L_{Y\_disc}$ by itself, and sends the $L_{Y\_disc}$ to the server.

In some embodiments, the server may generate the session key $B_S$ according to $L_C$.

Optionally, the server may correct $B_X$ and $B_Y$ by using $L_C$, and calculate a bit matching ratio B between the corrected $B_X$ and $B_Y$. Then the server may determine the authentication between the UE and the vehicle is successful when the bit matching ratio B is above threshold $T_B$.

Optionally, the server may calculate the Pearson correlation coefficient P between the set X and the set Y; then the server may determine the authentication between the UE and the vehicle is successful when the Pearson correlation coefficient P is above threshold $T_P$.

Optionally, the server may send the session key $B_S$ or $L_C$ to the UE and the vehicle after determining the authentication between the UE and the vehicle is successful.

S302, obtaining, by the vehicle, a first session key $B_{S1}$, wherein the first session key $B_{S1}$ is generated according to $L_C$ or the session key $B_S$ from the server.

In some embodiments, in S302, the obtaining the first session key $B_{S1}$ comprises: receiving, by the vehicle, a first message from the server, wherein the first message includes: $(E(K_{pub\_V}, m_{10}), S(K_{priv\_S}, m_{12})$, wherein the notation E(k, m) means encryption of message m using secret key k, the notation S(k, m) denotes digital signature on m using key k, $K_{pub\_V}$ is the public key of the vehicle, $K_{priv\_S}$ is the private key of the server, $m_{10}$=n∥CMD_AUTH_FINISH∥$B_S$, n is a nonce, CMD_AUTH_FINISH is a command identifier(ID), $B_S$ is the session key. determining, by the vehicle, the session key $B_S$ extracted from the first message as the first session key $B_{S1}$. In some other embodiments, in S302, the obtaining the first session key $B_{S1}$ comprises: receiving, by the vehicle, a third message from the server, the third message includes: $(E(K_{pub\_V}, m_{10}), S(K_{priv\_S}, m_{11})$, wherein the notation F(k, m) means encryption of message m using secret key k, notation S(k, m) denotes digital signature on m using key k, $K_{pub\_V}$ is the public key of the vehicle, $K_{priv\_S}$ is the private key of the server, $m_{10}$=n∥ CMD_LIST_COM∥ $L_C$, n is a nonce, CMD_LIST_COM is a command ID. generating, by the vehicle, the first session key $B_{S1}$ according to $L_C$.

$L_C$ is a list of common indexes by combining $L_{X\_disc}$ and $L_{Y\_disc}$, and $L_{X\_disc}$ is a list of indexes discarded during the quantization of a set X, $L_{Y\_disc}$ is a list of indexes discarded during the quantization of a set Y, wherein the set X is a set of samples of RSSIs of a wireless channel of a UE, and the set Y is a set of samples of RSSIs of a wireless channel of the vehicle.

S303, sending, by the server, and correspondingly, receiving, by the UE, $L_C$ or the session key $B_S$.

In some embodiments, in S303, the receiving, by the UE, $L_C$ or the session key $B_S$, comprises: receiving, by the UE, a fourth message from the server, wherein the fourth message includes: $(E(K_{pub\_D}, m_{10}), S(K_{priv\_S}, m_{11})$, wherein the notation E(k, m) means encryption of message m using secret key k, the notation S(k, m) denotes digital signature on m using key k, $K_{pub\_D}$ is the public key of the UE, $K_{priv\_S}$ is the private key of the server, $m_{10}$=n∥ CMD_AUTH_FINISH∥ $B_S$, n is a nonce, CMD_AUTH_FINISH is a command identifier(ID), $B_S$ is a session key generated by the server according to $L_C$, and $m_{11}$=H(E($K_{pub\_D}, m_{10}$)), the notation H(k, m) is the cryptographic hash on m using key k. In other embodiments, in S303, the receiving, by the UE, $L_C$ or the session key $B_S$, comprises: receiving, by the UE, a fifth message from the server, wherein the fifth message includes: $(E(K_{pub\_D}, m_{12}), S(K_{priv\_S}, m_{13})$, wherein the notation E(k, m) means encryption of message m using secret key k, the notation S(k, m) denotes digital signature on m using key k, $K_{pub\_D}$ is the public key of the UE, $K_{priv\_S}$ is the private key of the server, $m_{12}$=n‖CMD_SS‖$B_S$, n is a nonce, CMD_SS is a command ID, Bs is a session key generated by the server according to $L_C$, and $m_{13}$=H(E($K_{pub\_D}$, $m_{12}$)), the notation H(k, m) is the cryptographic hash on m using key k.

S304, obtaining, by the UE, a second session key $B_{S2}$, wherein the second session key $B_{S2}$ is generated according to $L_C$ from the server.

In some embodiments, the UE may generate the session key $B_{S2}$ according to $L_C$. In some other embodiments, the UE may extracts the session key $B_S$ from the message hashed by $B_S$, e.g. the fourth message or the fifth message received from the server, and determines the session key $B_S$ as the second session key $B_{S2}$.

S305, sending, by the UE, and correspondingly, receiving, by the vehicle, a second message, wherein the second message is hashed by the second session key $B_{S2}$, the second session key $B_{S2}$ is also generated according to $L_C$ generated by the server.

In some embodiments, the second message comprises: (E($K_U$, $m_{13}$), S($K_{priv\_D}$, $m_{14}$)), wherein the notation E(k, m) means encryption of message m using secret key k, notation S(k, m) denotes digital signature on m using key k, $K_U$ is a BLUETOOTH user device key shared between the UE and the vehicle by a trusted entity, $K_{priv\_D}$ is the private key of the UE, $m_{13}$=n‖ CMD_AUTH_CHK, n is a nonce, CMD_AUTH_CHK is a command ID, $m_{14}$=H($B_{S2}$, E($K_U$, $m_{13}$)), the notation H(k, m) is the cryptographic hash on m using key k, $B_{S2}$ is the second session key.

In some other embodiments, the second message comprises: (E($K_U$, $m_{14}$),S($K_{priv\_D}$, $m_{15}$)), wherein the notation E(k, m) means encryption of message m using secret key k, notation S(k, m) denotes digital signature on m using key k, $K_U$ is a BLUETOOTH user device key shared between the UE and the vehicle by a trusted entity, n is a nonce, $K_{priv\_D}$ is the private key of the UE, $m_{14}$=n‖ CMD_AUTH_CHK, CMD_AUTH_CHK is a command ID, and $m_{15}$=H($B_{S2}$, E($K_U$, $m_{14}$)), the notation H(k, m) is the cryptographic hash on m using key k, $B_{S2}$ is the second session key.

S306, extracting, by the vehicle, the second session key $B_{S2}$ from the second message.

S307, determining, by the vehicle, if the first session key $B_{S1}$ is the same as the second session key $B_{S2}$, the authentication between the UE and the vehicle is successful.

In some embodiments, if the first session key $B_{S1}$ is the same as the second session key $B_{S2}$, the vehicle may send an acknowledgement message to the UE, wherein the acknowledgement message is used to acknowledge the authentication between the UE and the vehicle. If the first session key $B_{S1}$ is different from the second session key $B_{S2}$, the vehicle may send a rejection message to the UE, wherein rejection message is used to reject the authentication between the UE and the vehicle.

The proposed method uses a server to verify between the vehicle and the UE, and has no direct communication between vehicle and UE during authentication. Hence attacker cannot launch data modification, false data injection, relay or replay attack. Furthermore, the server can use robust methods to analyze the wireless RSS data shared by vehicle and UE without worrying about the danger of leaking any useful information during authentication, does not leak any useful information during authentication.

The complete solution for remote server assisted authentication for wireless enabled UE and a vehicle, that uses physical layer features of wireless channel viz., RSS for proximity verification and authentication. PKI-based private-public keys are used for robust secure communication in this method.

Some alternative solutions to proposed method are performing all RSSI based authentication methods locally on user device and vehicle itself and by exchanging the related messages/content during protocol execution for authentication. However, the proposed procedure eliminates all the need of processing locally on individual parties, hence it is more secure and robust, and easy to implement.

The mutual authentication between UE and vehicle consists of multiple steps as below: a) channel sampling, and b) authentication.

Figure 4:
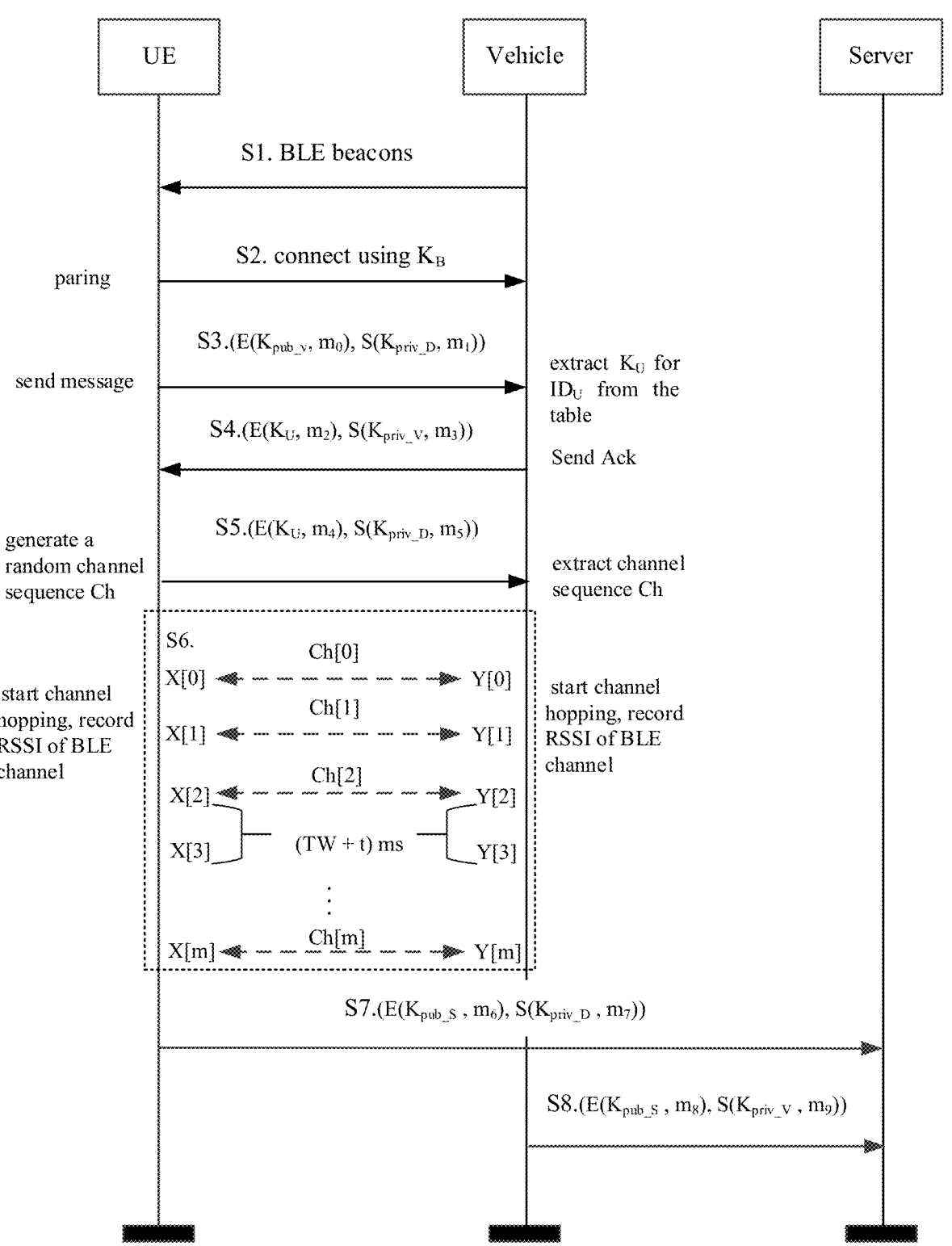
FIG. 4 is a flowchart of protocol for channel sampling.
Figure 5:
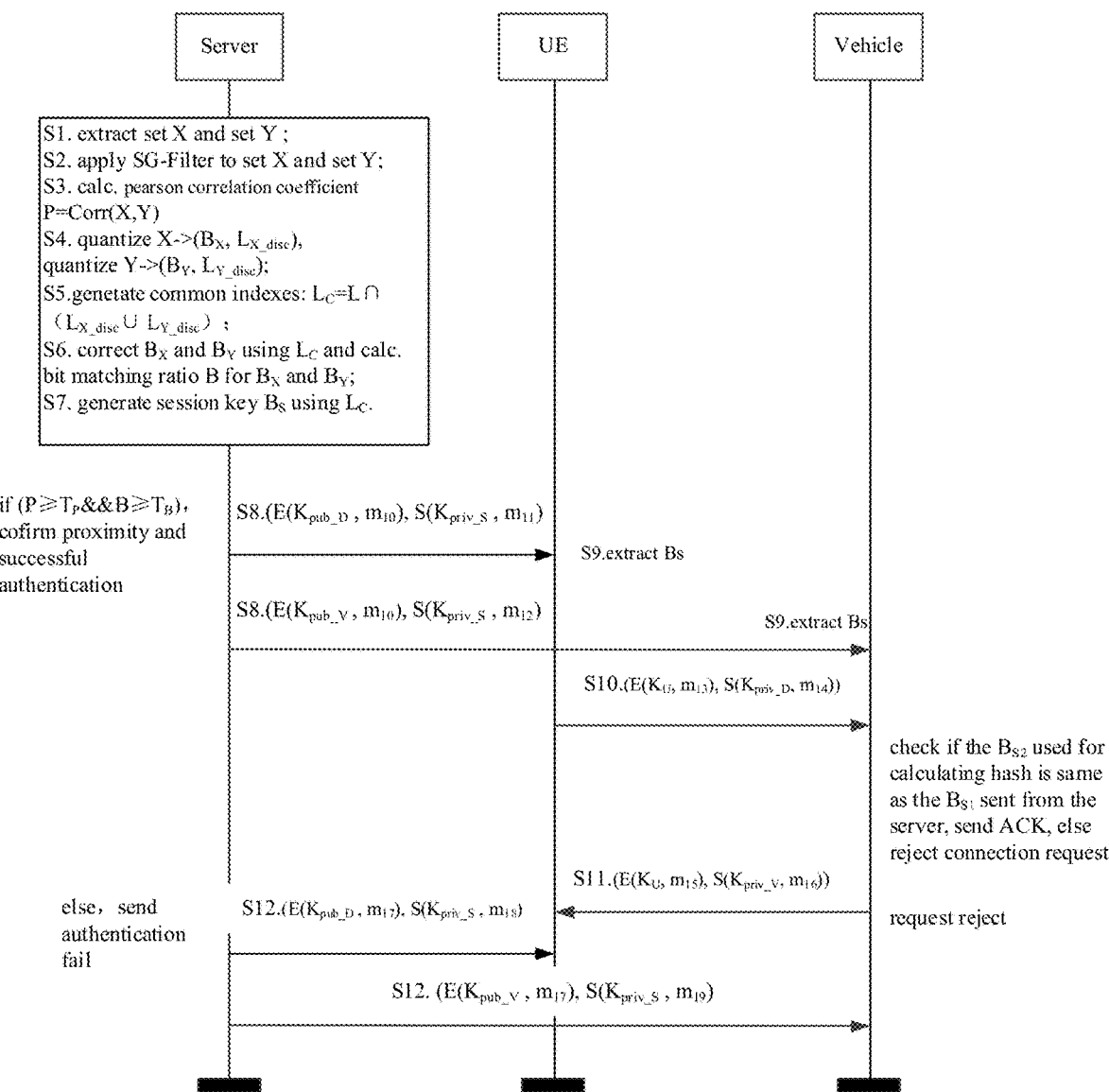
FIG. 5 is a flowchart of protocol for mutual authentication.

FIG. 4 and FIG. 5 are flowcharts of another embodiment of a method for authentication, wherein FIG. 4 is a flowchart of protocol for channel sampling, and FIG. 5 is a flowchart of protocol for mutual authentication.

As shown in FIG. 4, The steps of channel sampling followed are as follows:

Step 1: the vehicle transmits periodic BLE beacons.

Step 2: the UE detects the vehicle beacon and connects to it via BLE using pre-shared key $K_B$.

Step 3: the UE sends a message with the following content:

(E($K_{pub\_V}$, $m_0$), S($K_{priv\_D}$, $m_1$)), wherein $K_{pub\_V}$ is the public key of vehicle, Notation E(k, m) means encryption of message m using secret key k, Notation S(k, m) denotes digital signature on m using key k, $m_0$=$ID_U$‖CMD_START_REC, $ID_U$ is the ID of the UE, CMD_START_REC is the command ID to start recording RSSI, $m_1$=H($K_U$, E($K_{pub\_V}$, $m_0$)), Notation H(k, m) is the cryptographic hash on m using key k.

Step 4: the vehicle extracts $K_U$ for $ID_U$ from the table stored in its memory, and sends an Acknowledgement message with a nonce n, with following content:

(E($K_U$, $m_2$), S($K_{priv\_V}$, $m_3$)), wherein $m_2$=n‖CMD_ACK_REC, CMD_ACK_REC is the command ID to acknowledge recording, $m_3$=H($K_U$, E($K_U$, $m_2$)).

Step 5: the UE generates a random channel sequence Ch and sends message with following content:

(E($K_U$, $m_4$), S($K_{priv\_D}$, $m_5$)), where $m_4$=n‖Ch‖TW‖ CMD_CHN, TW is the wait period, CMD_CHN is the command ID, and $m_5$=H($K_U$, E($K_U$, $m_4$)).

Step 6: both the parties start channel sampling, i.e., record RSSI of BLE channel along with channel hopping as per the channel sequence Ch, with total wait period on each channel=(TW+t) ms, and t is the channel sampling period. The set of RSSI captured by UE is denoted by X[ ], and the same for vehicle is denoted by Y[ ].

Step 7: the UE sends message to the server with following content:

Step 8: the vehicle sends a message to the server with following content:

(E($K_{pub\_S}$, $m_8$), S($K_{priv\_V}$, $m_9$)), where $m_8$=CMD_RSS_LOG‖Y[ ]‖n, CMD_RSS_LOG is the command ID, n is a nonce, and $m_9$=H(E($K_{pub\_S}$, $m_8$)).

After channel sampling, both the parties proceed to authenticate each other with the help of the server as illustrated in FIG. 5. The steps are as follows:

Step 1: the server extracts set X and set Y, wherein the set X is a set of samples of RSSI of a BLE channel of the UE, and the set Y is a set of samples of RSSI of a BLE channel of the vehicle.

Step 2: the server applies savitzsky-golay filter to set X and set Y to remove noise component and to make the signal smooth.

Step 3: the server calculates the Pearson correlation coefficient P between set X and set Y. P can be between −1 to +1. For example, positive value more than +0.7 indicates very good correlation between two data sets.

Step 4: the server applies quantization mechanism to set X and set Y to obtain bit strings $B_X$ and $B_Y$ and also the list of RSSI indexes discarded during quantization, i.e., $L_{X\_disc}$, and $L_{Y\_disc}$.

Step 5: the server generates the list of common indexes $L_C$ by combining $L_{X\_disc}$, and $L_{Y\_disc}$.

Step 6: the server corrects the bit strings $B_X$ and $B_Y$ by using $L_C$, and calculates a bit matching ratio B between the corrected $B_X$ and $B_Y$.

Step 7: the server generates a session key $B_S$ by using $L_C$.

Step 8: If the server determines the authentication is successful, then the server sends following message to the UE: $(E(K_{pub\_D}, m_{10}), S(K_{priv\_S}, m_{11}))$, and sends the following message the vehicle: $(E(K_{pub\_V}, m_{10}), S(K_{priv\_S}, m_{12}))$, wherein $m_{10}$=n∥ CMD_AUTH_FINISH∥ $B_S$, CMD_AUTH_FINISH is the command ID, n is a nonce, $m_{11}$=H($E(K_{pub\_D}, m_{10})$), and $m_{12}$=H($E(K_{pub\_V}, m_{10})$).

Optionally, if the Pearson correlation coefficient P is more than certain threshold $T_P$, and/or also if the bit matching rate B is above certain threshold $T_B$, then the server confirms that both the UE and the vehicle are within their communication range and are directly communicating with each other, meaning, there is not relay or replay attack, and hence it is a successful authentication. If the above condition is not met, then the server confirms that the authentication as fail.

Step 9: Both the UE and the vehicle extracts $B_S$ from received message.

Optionally, for ease of description, the vehicle may determine the BS extracted from the message as BS1, the vehicle may determine the BS extracted from the message as BS2.

Step 10: the UE sends following message to the vehicle: $(E(K_U, m_{13}), S(K_{priv\_D}, m_{14}))$, wherein $m_{13}$=n∥ CMD_AUTH_CHK, CMD_AUTH_CHK is the command ID, $m_{14}$=H($B_{S2}, E(K_U, m_{13})$).

Step 11: the vehicle checks if the $B_{S2}$ used for calculating hash is the same as the $B_{S1}$ sent from the server. If yes, then the vehicle may send acknowledgement message to the UE, else the vehicle may reject the connection between the vehicle and the UE.

Optionally, the acknowledgement message consists of the following content:

$(E(K_U, m_{15}), S(K_{priv\_V}, m_{16}))$, wherein mis=n∥CMD_AUTH_ACK, CMD_AUTH_ACK is the command ID, and $m_{16}$=H($B_S, E(K_U, m_{15})$).

If the authentication is not successful, then the server sends following message to the UE:

$(E(K_{pub\_D}, m_{17}), S(K_{priv\_S}, m_{18})$ wherein $m_{17}$=n∥ CMD_AUTH_REJECT, and CMD_AUTH_REJECT is the command ID, and $m_{18}$=H($E(K_{pub\_D}, m_{17})$).

Step 12: If the server determines the authentication is not successful, then the server sends following message to the vehicle: $(E(K_{pub\_V}, m_{17}), S(K_{priv\_S}, m_{19}))$, and sends following message to the UE: $(E(K_{pub\_D}, m_{17}), S(K_{priv\_S}, m_{18})$.

wherein $m_{17}$=n∥ CMD_AUTH_REJECT, and CMD_AUTH_REJECT is the command ID, n is a nonce, and $m_{18}$=H($E(K_{pub\_D}, m_{17})$), $m_{19}$=H($E(K_{pub\_V}, m_{17})$).

Figure 6:
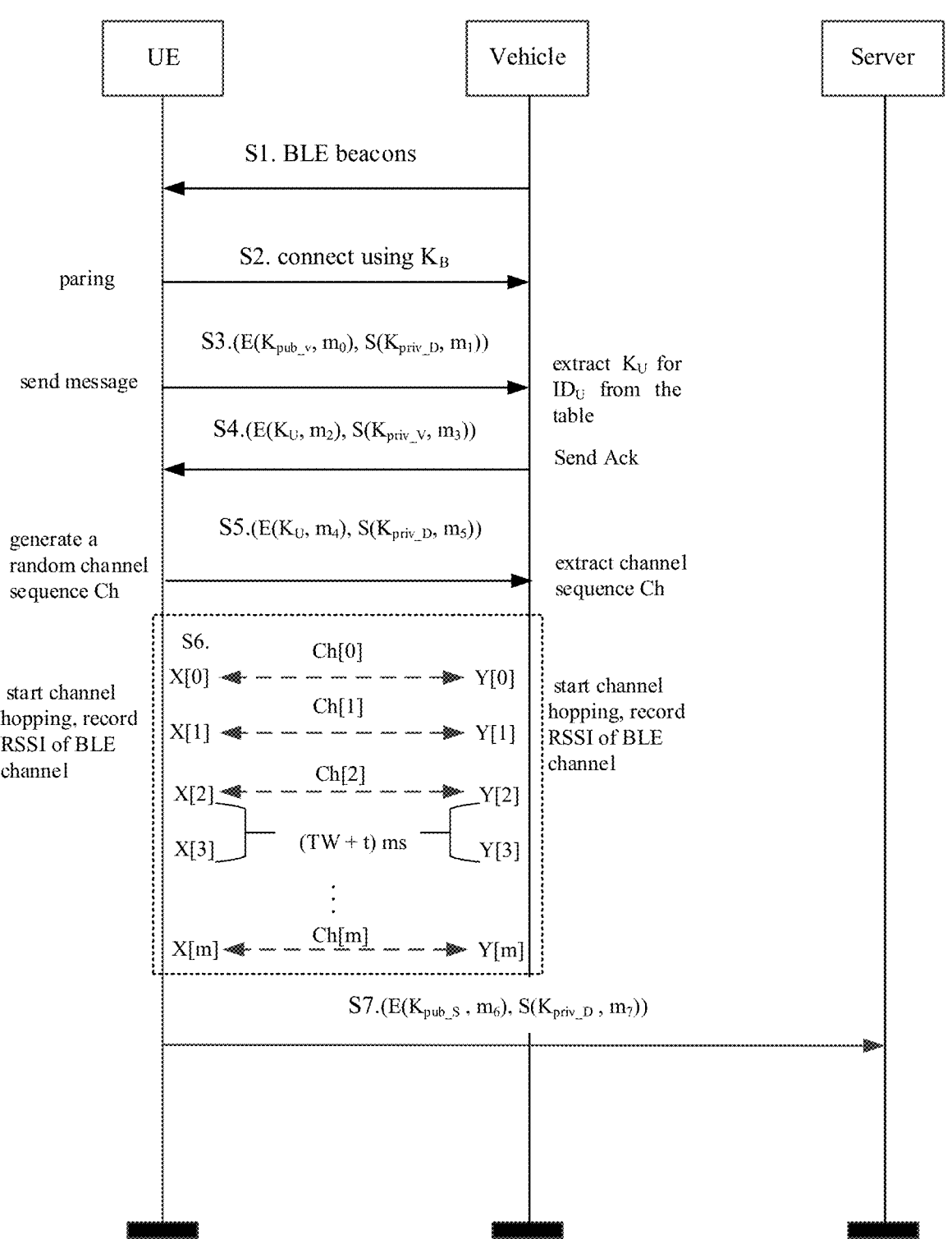
FIG. 6 is a flowchart of protocol for channel sampling.
Figure 7:
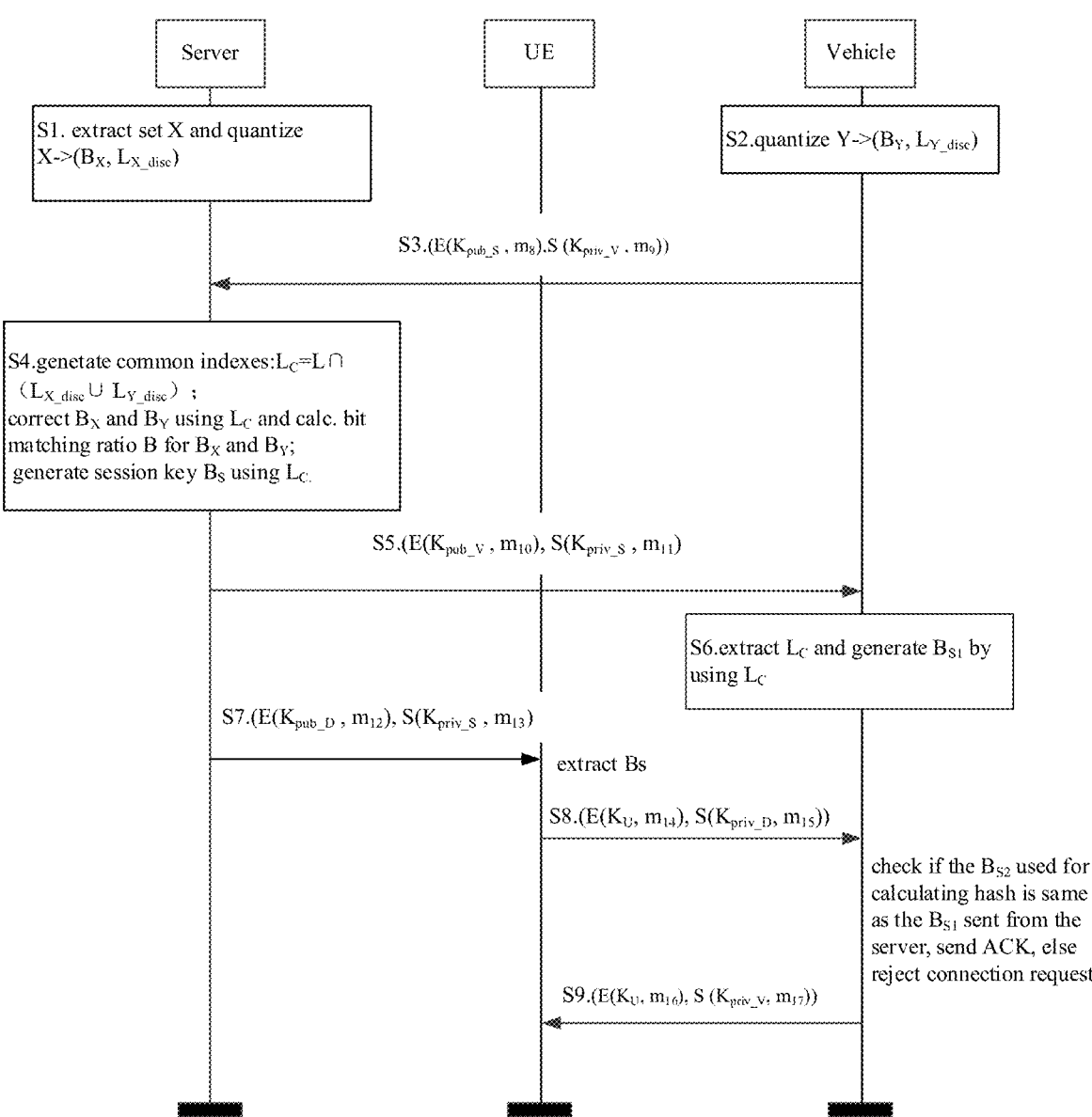
FIG. 7 is a flowchart of protocol for mutual authentication.

In the following section, another solution for remote server based mutual authentication between UE and vehicle will be described wherein only the functionalities of UE are delegated to remote server. This process also consists of two phases as in the embodiment above. FIG. 6 is a flowchart of protocol for channel sampling, and FIG. 7 is a flowchart of protocol for mutual authentication.

As shown in FIG. 6, The steps of channel sampling followed are as follows:

Step 1: the vehicle transmits periodic BLE beacons.

Step 2: the UE detects the vehicle beacon and connects to it via BLE using pre-shared key $K_B$.

Step 3: the UE sends a message to the vehicle with the following content:

$(E(K_{pub\_V}, m_0), S(K_{priv\_D}, m_1))$, wherein $K_{pub\_V}$ is the public key of vehicle, Notation E(k, m) means encryption of message m using secret key k, Notation S(k, m) denotes digital signature on m using key k, $m_0$=$ID_U$∥CMD_START_REC, IDU is the ID of the UE, CMD_START_REC is the command ID to start recording RSSI, $m_1$=H($K_U, E(K_{pub\_V}, m_0)$), Notation H(k, m) is the cryptographic hash on m using key k.

Step 4: the vehicle extracts $K_U$ for $ID_U$ from the table stored in its memory, and sends an acknowledgement message with a nonce n, with following content:

$(E(K_U, m_2), S(K_{priv\_V}; m_3))$, wherein $m_2$=n∥ CMD_ACK_REC, CMD_ACK_REC is the command ID to acknowledge recording, $m_3$=H($K_U, E(K_U, m_2)$).

Step 5: the UE generates a random channel sequence Ch and sends message with following content:

$(E(K_U, m_4), S(K_{priv\_D}, m_5))$, wherein $m_4$=n∥ Ch∥ TW∥ CMD_CHN, TW is the wait period, CMD_CHN is the command ID, and $m_5$=H($K_U, E(K_U, m_4)$).

Step 6: Both the parties start channel sampling, i.e., record RSSI of BLE channel along with channel hopping as per the channel sequence Ch, with total wait period on each channel=(TW+t) ms, and t is the channel sampling period. The set of RSSI captured by UE is denoted by X[ ], and the same for vehicle is denoted by Y[ ].

Step 7: the UE sends message to the server with following content:

$(E(K_{pub\_S}, m_6), S(K_{priv\_D}, m_7))$, where $m_6$=CMD_RSS_LOG∥ X[ ] ∥ n, and CMD_RSS_LOG is the command ID, n is a nonce, and $m_7$=H($E(K_{pub\_S}, m_6)$).

It should be noted that, the vehicle will not send the set Y to the server and will generate the bit string $B_Y$ and $L_{Y\_disc}$ according to the set Y by itself as described in the following part.

After channel sampling, both the parties proceed to authenticate each other as illustrated in FIG. 6. The steps followed are as follows:

Step 1: the server extracts the set X and applies quantization to the set X to extract the bit string $B_X$ and the list of indexes discarded $L_{X\_disc}$.

Optionally, before applying the quantization to the set X, the server may apply SG (curve smoothing) filter to the set X.

Step 2: the vehicle applies quantization method to extract the bit string $B_Y$ and the list of indexes discarded $L_{Y\_disc}$.

Optionally, in some embodiments, before applying the quantization to the set Y, the vehicle may apply SG (curve smoothing) filter to the set Y.

Step 3: the vehicle sends following message to the server:

$(E(K_{pub\_S}, m_8), S(K_{priv\_V}, m_9))$, wherein mg=n∥ CMD_LIST_DISC∥ $L_{Y\_disc}$, CMD_LIST_DISC is the command ID, and $m_9$=H($E(K_{pub\_S}, m_8)$).

Step 4: the server generates the list of common indexes $L_C$ by combining $L_{X\_disc}$, and $L_{Y\_disc}$ and generates a session secret $B_S$ by using $L_C$.

Optionally, in some embodiments, before generating the $B_S$, the server may corrects the bit strings $B_X$ by using $L_C$.

Step 5: the server sends following message to the vehicle: ($E(K_{pub\_V},\ m_{10})$, $S(K_{priv\_S},\ m_{11})$, wherein $m_{10}=n$ CMD_LIST_COM$\|_C$, CMD_LIST_COM is the command ID, n is a nonce, and $m_{11}=H(E(K_{pub\_V},\ m_{10}))$.

Step 6: the vehicle extracts $L_C$ and generates the first session secrete $B_{S1}$ by using $L_C$.

Optionally, in some embodiments, before generating the $B_{S1}$, the server may corrects the bit strings $B_X$ by using $L_C$.

Step 7: the server sends the following message to the UE: ($E(K_{pub\_D},\ m_{12})$, $S(K_{priv\_S},\ m_{13})$, wherein $m_{12}=n\|$ CMD_SS$\|$ $B_S$, CMD_SS is the command ID, and $m_{13}=H(E(K_{pub\_D},\ m_{12}))$.

Step 8: the UE extracts $B_S$ from the received message, determines the $B_S$ as $B_{S2}$, and sends following message to the vehicle: ($E(K_U,\ m_{14})$, $S(K_{priv\_D},\ m_{15})$), where $m_{14}=n$ CMD_AUTH_CHK, CMD_AUTH_CHK is the command ID, and $m_{15}=H(B_{S2},\ E(K_U,\ m_{14}))$.

Step 9: the vehicle checks if $B_{S2}$ used for hash in the message is the same as the $B_{S1}$ calculated by itself. If yes, then the vehicle may send acknowledgement message to the UE, else the vehicle may reject the connection between the vehicle and the UE.

Optionally, the acknowledgement message consists of the following content:

($E(K_U,\ m_{16})$,$S(K_{priv\_V},\ m_{17})$), wherein $m_{16}=n\|$CMD_AUTH_ACK, CMD_AUTH_ACK is the command ID, n is a nonce, and $m_{17}=H(B_S,\ E(K_U,\ m_{16}))$.

The scheme is easy to incorporate/implement even in existing devices, and provides robust mutual authentication by employing BLE channel physical layer features—RSS, that are hard to spoof and predict by adversary. The protocol proves proximity of UE to vehicle and vice versa, mitigates active attacks like replay, replay, data injection, data modification attacks on Digital key solutions.

Remote server based security solutions are becoming increasingly popular in vehicle industry, due to the fact that attacker cannot interfere easily. Hence, the proposed solution has many practical applications and can be employed widely in similar wireless systems that require authentication.

Figure 8:
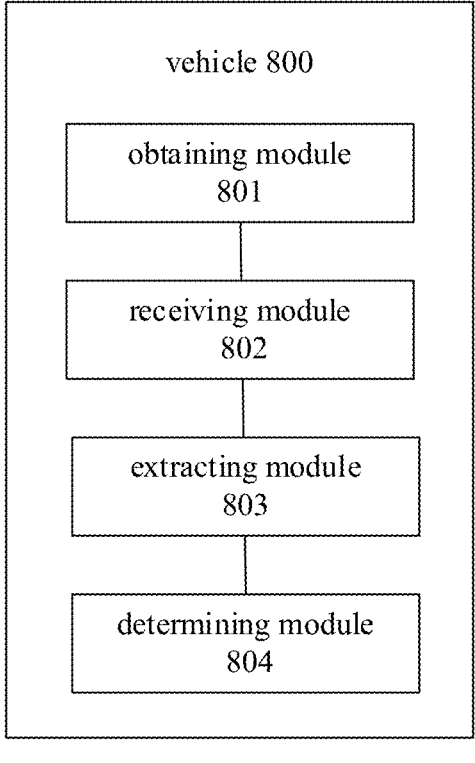
FIG. 8 is a schematic block diagram of a vehicle 800.

FIG. 8 is a schematic block diagram of a vehicle 800 according to an embodiment. As shown in FIG. 8, the vehicle 800 includes: an obtaining module 801, a receiving module 802, an extracting module 803 and a determining module 804.

In some embodiments, the vehicle 300 may be configured to execute the above method executed by the vehicle illustrated from FIG. 2 to FIG. 7.

Figure 9:
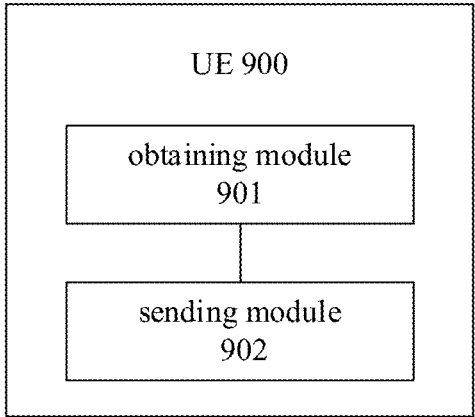
FIG. 9 is a schematic block diagram of a UE 900

FIG. 9 is a schematic block diagram of a UE 900 according to an embodiment. As shown in FIG. 9, the UE 900 includes: an obtaining module 901 and a sending module 902.

In some embodiments, the UE 900 may be configured to execute the above method executed by the UE illustrated from FIG. 2 to FIG. 7.

Figure 10:
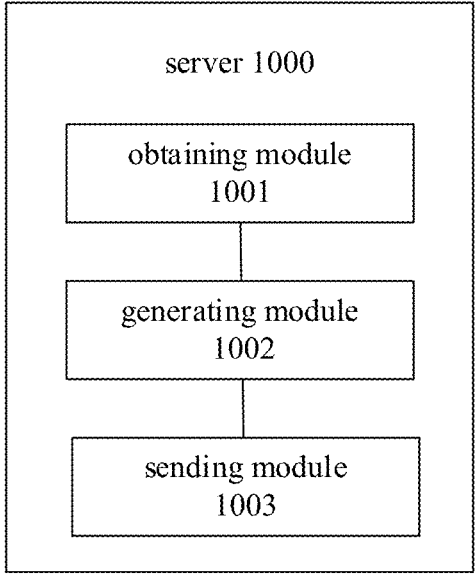
FIG. 10 is a schematic block diagram of a server 1000

FIG. 10 is a schematic block diagram of a server 1000 according to an embodiment. As shown in FIG. 10, the server 1000 includes: an obtaining module 1001, a generating module 1002 and a sending module 1003.

In some embodiments, the server 1000 may be configured to execute the above method executed by the server illustrated from FIG. 2 to FIG. 7.

Figure 11:
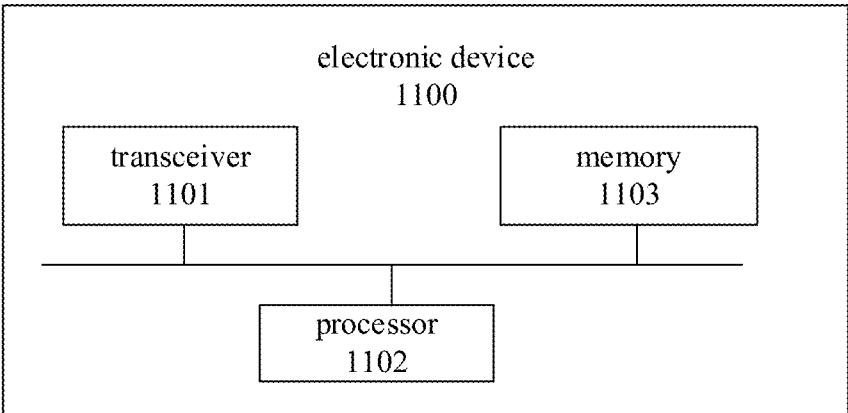
FIG. 11 is a schematic block diagram of an electronic device 1100.

FIG. 11 is a schematic block diagram of an electronic device 1100 according to an embodiment.

As shown in FIG. 11, the electronic device 1100 may include a transceiver 1101, a processor 1102, and a memory 1103. The memory 1103 may be configured to store code, instructions, and the like executed by the processor 1102.

In some embodiments, the electronic device 1100 may be a vehicle and may execute the above method executed by the vehicle illustrated from FIG. 2 to FIG. 7.

In some embodiments, the electronic device 1100 may be a UE and may execute the above method executed by the UE illustrated from FIG. 2 to FIG. 7.

In some embodiments, the electronic device 1100 may be a server and may execute the above method executed by the server illustrated from FIG. 2 to FIG. 7.

It should be understood that the processor 1102 may be an integrated circuit chip and has a signal processing capability. In an implementation process, steps of the foregoing method embodiments may be completed by using a hardware integrated logic circuit in the processor, or by using instructions in a form of software. The processor may be a general purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and the logical block diagrams in the disclosed embodiments. The general purpose processor may be a microprocessor, or the processor may be another processor or the like. The steps of the methods disclosed with reference to the embodiments of the present disclosure may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware in the processor.

It may be understood that the memory 1103 in the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) and is used as an external cache. By way of example rather than limitation, many forms of RAMs may be used, and are, for example, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DR RAM).

It should be noted that the memory in the systems and the methods described in this specification includes but is not limited to these memories and a memory of any other appropriate type.

An embodiment further provides a system chip, where the system chip includes an input/output interface, at least one processor, at least one memory, and a bus. The at least one memory is configured to store instructions, and the at least one processor is configured to invoke the instructions of the at least one memory to perform operations in the methods in the foregoing embodiments.

An embodiment further provides a computer storage medium, where the computer storage medium may store a program instruction for performing any of the foregoing methods.

Optionally, the storage medium may be specifically the memory 1103.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely examples of implementations of embodiments, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An apparatus, comprising:
a memory configured to store programming instructions; and
one or more processors coupled to the memory and configured to execute the instructions to cause the apparatus to:
obtain a first session key $B_{S1}$, wherein the first session key $B_{S1}$ is based on $L_C$ from a server, wherein Lc is a list of common indexes combining $L_{X\_disc}$ and $L_{Y\_disc}$, wherein $L_{X\_disc}$ is a list of indexes discarded during quantization of a set X, wherein $L_{Y\_disc}$ is a list of indexes discarded during quantization of a set Y, wherein X is a set of samples of first received signal strength indicators (RSSIs) of a wireless channel of a user equipment (UE), and wherein Y is a set of samples of second RSSIs of a wireless channel of a vehicle;
receive a first message from the UE, wherein the first message is hashed by a second session key $B_{S2}$, and wherein the second session key $B_{S2}$ is based on Lc;
extract $B_{S2}$ from the first message; and
authenticate a session between the UE and the vehicle when the first session key $B_{S1}$ is the same as the second session key $B_{S2}$.

2. The apparatus of claim 1, wherein the one or more processors are further configured to execute the instructions to cause the apparatus to receive a second message from the server, wherein the second message comprises ($E(K_{pub\_V}, m_{10})$, $S(K_{priv\_S}, m_{12})$), wherein E(k, m) denotes encryption of message m using secret key k, wherein S(k, m) denotes a digital signature on m using key k, wherein $K_{pub\_V}$ is a public key of the vehicle, wherein $K_{priv\_S}$ is a private key of the server, wherein $m_{10}$=n‖CMD_AUTH_FINISH‖Bs, wherein n is a nonce, wherein CMD_AUTH_FINISH is a first command identifier (ID) for authentication finishing, wherein Bs is a session key, wherein Bs is extracted from the first message as the first session key $B_{S1}$, wherein $m_{12}$=n‖CMD_SS‖Bs, and wherein CMD_SS is a second command ID for a session secret.

3. The apparatus of claim 2, wherein the first message comprises ($E(K_U, m_{13})$, $S(K_{priv\_D}, m_{14})$), wherein E(k, m) denotes encryption of message m using a secret key k, wherein S(k, m) denotes digital signature on m using key k, wherein $K_U$ is a BLUETOOTH user device key shared between the UE and the vehicle by a trusted entity, wherein $K_{priv\_D}$ is the private key of the UE, wherein $m_{13}$=n‖CMD_AUTH_CHK, wherein n is a nonce, wherein CMD_AUTH_CHK is a third command ID for authentication checking, wherein $m_{14}$=H ($B_{S2}, E(K_U, m_{13})$), wherein H(k, m) is a cryptographic hash on m using key k, and wherein $B_{S2}$ is the second session key.

4. The apparatus of claim 1, wherein the one or more processors are further configured to execute the instructions to further cause the apparatus to:
receive a third message from the server, wherein the third message includes: ($E(K_{pub\_V}, m_{10})$, $S(K_{priv\_S}, m_{11})$), wherein E(k, m) denotes encryption of message m using secret key k, wherein S(k, m) denotes digital signature on m using key k, wherein $K_{pub\_V}$ is a public key of the vehicle, wherein $K_{priv\_S}$ is a private key of the server, wherein $m_{10}$=n‖CMD_LIST_COM‖Lc, wherein n is a nonce, wherein CMD_LIST_COM is a first command identifier (ID) for list of common indices or items, wherein $m_{11}$ is H(E($K_{pub\_D}$,$m_{10}$), wherein H (k, m) is a cryptographic hash on m using key k, and wherein $K_{pub\_D}$ is a public key of the UE; and
generate the first session key $B_{S1}$ according to Lc.

5. The apparatus of claim 4, wherein the first message comprises (E($K_U$,$m_{14}$),S($K_{priv\_D}$,$m_{15}$)), wherein E(k, m) denotes encryption of message m using secret key k, wherein S(k, m) denotes digital signature on m using key k, wherein $K_U$ is a BLUETOOTH user device key shared between the UE and the vehicle by a trusted entity, wherein n is a nonce, wherein $K_{priv\_D}$ is a private key of the UE, wherein $m_{14}$=n‖CMD_AUTH_CHK, wherein CMD_AUTH_CHK is a second command ID for authentication checking, wherein $m_{15}$=H ($B_{S2}$,E($K_U$,$m_{14}$), and wherein $B_{S2}$ is the second session key.

6. The apparatus of claim 1, wherein the one or more processors are further configured to execute the instructions to further cause the apparatus to:
obtain Y by recoding the second RSSIs; and
send Y to the server.

7. The apparatus of claim 1, wherein the one or more processors are further configured to execute the instructions to further cause the apparatus:
obtain Y by recoding the second RSSIs;
obtain a bit string $B_Y$ and $L_{Y\_disc}$ by applying quantization to Y; and
send the bit string $B_Y$ and $L_{Y\_disc}$ to the server.

8. A method comprising:
obtaining a first session key $B_{S1}$, wherein the first session key $B_{S1}$ is based on Lc from a server, wherein Lc is a list of common indexes combining $L_{X\_disc}$ and $L_{Y\_disc}$, wherein $L_{X\_disc}$ is a list of indexes discarded during quantization of a set X, wherein $L_{Y\_disc}$ is a list of indexes discarded during quantization of a set Y, wherein X is a set of samples of first received signal strength indicators (RSSIs) of a wireless channel of a user equipment (UE), and wherein Y is a set of samples of second RSSIs of a wireless channel of a vehicle;
receiving a first message from the UE, wherein the first message is hashed by a second session key $B_{S2}$, and wherein the second session key $B_{S2}$ is based on Lc;
extracting $B_{S2}$ from the first message; and
authenticating a session between the UE and the vehicle when the first session key $B_{S1}$ is the same as the second session key $B_{S2}$.

9. The method of claim 8, further comprising receiving a second message from the server, wherein the second message comprises (E($K_{pub\_V}$,$m_{10}$),S($K_{priv\_S}$,$m_{12}$), wherein E(k, m) denotes encryption of message m using secret key k, wherein S(k, m) denotes a digital signature on m using key k, wherein $K_{pub\_V}$ is a public key of the vehicle, wherein $K_{priv\_S}$ is a private key of the server, wherein $m_{10}$=n‖CMD_AUTH_FINISH‖Bs, wherein n is a nonce, wherein CMD_AUTH_FINISH is a first command identifier (ID) for authentication finishing, wherein Bs is a session key, wherein Bs is extracted from the first message as the first session key $B_{S1}$, wherein $m_{12}$=n‖CMD_SS‖Bs, and wherein CMD_SS is a second command ID for a session secret.

10. The method of claim 9, wherein the first message comprises (E($K_U$,$m_{13}$), S($K_{priv\_D}$,$m_{14}$)), wherein E(k, m) denotes encryption of message m using a secret key k, wherein S(k, m) denotes digital signature on m using key k, wherein $K_U$ is a BLUETOOTH user device key shared between the UE and the vehicle by a trusted entity, wherein $K_{priv\_D}$ is the private key of the UE, wherein $m_{13}$=n‖CMD_AUTH_CHK, wherein n is a nonce, wherein CMD_AUTH_CHK is a third command ID for authentication checking, wherein $m_{14}$=H($B_{S2}$,E($K_U$,$m_{13}$)), wherein H(k, m) is a cryptographic hash on m using key k, and wherein $B_{S2}$ is the second session key.

11. The method of claim 8, further comprising:
receiving a third message from the server, wherein the third message includes: (E($K_{pub\_V}$,$m_{10}$), S($K_{priv\_S}$, $m_{11}$), wherein E(k, m) denotes encryption of message m using secret key k, wherein S(k, m) denotes digital signature on m using key k, wherein $K_{pub\_V}$ is a public key of the vehicle, wherein $K_{priv\_S}$ is a private key of the server, wherein $m_{10}$=n‖CMD_LIST_COM‖Lc, wherein n is a nonce, wherein CMD_LIST_COM is a first command identifier (ID) for list of common indices or items, wherein $m_{11}$ is H(E($K_{pub\_D}$, $m_{10}$)), wherein H(k, m) is a cryptographic hash on m using key k, and wherein $K_{pub\_D}$ is a public key of the UE; and
generating the first session key $B_{S1}$ according to Lc.

12. The method of claim 11, wherein the first message comprises (E($K_U$,$m_{14}$), S($K_{priv\_D}$,$m_{15}$)), wherein E(k, m) denotes encryption of message m using secret key k, wherein S(k, m) denotes digital signature on m using key k, wherein $K_U$ is a BLUETOOTH user device key shared between the UE and the vehicle by a trusted entity, wherein n is a nonce, wherein $K_{priv\_D}$ is a private key of the UE, wherein $m_{14}$=n‖CMD_AUTH_CHK, wherein CMD_AUTH_CHK is a second command ID for authentication checking, wherein $m_{15}$=H($B_{S2}$,E($K_U$,$m_{14}$)), and wherein $B_{S2}$ is the second session key.

13. The method of claim 8, further comprising:
obtaining Y by recoding the second RSSIs; and
sending Y to the server.

14. The method of claim 8, further comprising:
obtaining Y by recoding the second RSSIs;
obtaining a bit string $B_Y$ and $L_{Y\_disc}$ by applying quantization to Y; and
sending the bit string $B_Y$ and $L_{Y\_disc}$ to the server.

15. A computer program product stored in a non-transitory computer readable medium and comprising a computer program that, when executed by one or more processors, causes an electronic device to:
obtain a first session key $B_{S1}$, wherein the first session key $B_{S1}$ is based on Lc from a server, wherein Lc is a list of common indexes combining $L_{X\_disc}$ and $L_{Y\_disc}$, wherein $L_{X\_disc}$ is a list of indexes discarded during quantization of a set X, wherein $L_{Y\_disc}$ is a list of indexes discarded during quantization of a set Y, wherein X is a set of samples of first received signal strength indicators (RSSIs) of a wireless channel of a user equipment (UE), and wherein Y is a set of samples of second RSSIs of a wireless channel of a vehicle;
receive a first message from the UE, wherein the first message is hashed by a second session key $B_{S2}$, and wherein the second session key $B_{S2}$ is based on Lc;
extract $B_{S2}$ from the first message; and
authenticate a session between the UE and the vehicle when the first session key $B_{S1}$ is the same as the second session key $B_{S2}$.

16. The computer program product of claim 15, wherein the computer program that, when executed by the one or more processors, further causes the electronic device to receive a second message from the server, wherein the second message comprises (E($K_{pub\_V}$,$m_{10}$),S($K_{priv\_S}$,$m_{12}$), wherein E(k, m) denotes encryption of message m using secret key k, wherein S(k, m) denotes a digital signature on m using key k, wherein $K_{pub\_V}$ is a public key of the vehicle, wherein $K_{priv\_S}$ is a private key of the server, wherein $m_{10}$=n‖CMD_AUTH_FINISH‖Bs, wherein n is a nonce, wherein CMD_AUTH_FINISH is a first command identifier (ID) for authentication finishing, wherein Bs is a session key, wherein Bs is extracted from the first message as the first session key $B_{S1}$, wherein $m_{12}$=n‖CMD_SS‖Bs, and wherein CMD_SS is a second command ID for a session secret.

17. The computer program product of claim 16, wherein the first message comprises $(E(K_U,m_{13}),S(K_{priv\_D},m_{14}))$, wherein E(k, m) denotes encryption of message m using a secret key k, wherein S(k, m) denotes digital signature on m using key k, wherein $K_U$ is a BLUETOOTH user device key shared between the UE and the vehicle by a trusted entity, wherein $K_{priv\_D}$ is the private key of the UE, wherein $m_{13}$=n‖CMD_AUTH_CHK, wherein n is a nonce, wherein CMD_AUTH_CHK is a third command ID for authentication checking, wherein $m_{14}$=H($B_{S2}$,E($K_U$,$m_{13}$)), wherein H(k, m) is a cryptographic hash on m using key k, and wherein $B_{S2}$ is the second session key.

18. The computer program product of claim 15, wherein the computer program that, when executed by the one or more processors, further causes the electronic device to:

receive a third message from the server, wherein the third message includes: $(E(K_{pub\_V},m_{10}),S(K_{priv\_S},m_{11}))$, wherein E(k, m) denotes encryption of message m using secret key k, wherein S(k, m) denotes digital signature on m using key k, wherein $K_{pub\_V}$ is a public key of the vehicle, wherein $K_{priv\_S}$ is a private key of the server, wherein $m_{10}$=n‖CMD_LIST_COM‖Lc, wherein n is a nonce, wherein CMD_LIST_COM is a command identifier for list of common indices or items, wherein $m_{11}$ is H(E($K_{pub\_D}$,$m_{10}$)), wherein H(k, m) is a cryptographic hash on m using key k, and wherein $K_{pub\_D}$ is a public key of the UE; and generate the first session key $B_{S1}$ according to Lc.

19. The computer program product of claim 15, wherein the computer program that, when executed by the one or more processors, further causes the electronic device to:

obtain Y by recoding the second RSSIs; and send Y to the server.

20. The computer program product of claim 15, wherein the computer program that, when executed by the one or more processors, further causes the electronic device to:

obtain Y by recoding the second RSSIs;

obtain a bit string $B_Y$ and $L_{Y\_disc}$ by applying quantization to Y; and send the bit string $B_Y$ and $L_{Y\_disc}$ to the server.

* * * * *